United States Patent [19]

Yamada et al.

[11] 4,235,544
[45] Nov. 25, 1980

[54] DATA IMPRINTING LAMP CONTROL CIRCUIT

[75] Inventors: Seiji Yamada, Sakai; Norio Beppu, Sennan, both of Japan

[73] Assignee: Minolta Camera Kabushiki Kaisha, Osaka, Japan

[21] Appl. No.: 972,128

[22] Filed: Dec. 21, 1978

[30] Foreign Application Priority Data

Dec. 27, 1977 [JP] Japan .............................. 52-178664[U]

[51] Int. Cl.³ ...................... G03B 17/24; G03B 17/18
[52] U.S. Cl. ........................................ 354/106; 354/289
[58] Field of Search ........................ 354/105, 106, 109

[56] References Cited

U.S. PATENT DOCUMENTS

| | | | |
|---|---|---|---|
| 3,812,508 | 5/1974 | Matsuda et al. | 354/106 |
| 3,889,281 | 6/1975 | Taguchi et al. | 354/105 |
| 3,906,523 | 9/1975 | Ogiso et al. | 354/109 |
| 3,971,049 | 7/1976 | Ohmori et al. | 354/105 |
| 4,025,931 | 5/1977 | Taguchi et al. | 354/106 |
| 4,112,444 | 9/1978 | Yonemoto et al. | 354/106 |

FOREIGN PATENT DOCUMENTS 5243301 10/1977 Japan .

Primary Examiner—L. T. Hix
Assistant Examiner—William B. Perkey
Attorney, Agent, or Firm—Wolder, Gross & Yavner

[57] ABSTRACT

A lamp control circuit for energizing a data imprinting lamp in response to an actuation of a flash trigger switch in a camera, for a given period so that data images illuminated by the lamp are imprinted on a film with a suitable exposure. The control circuit includes a series connection of a SCR element and a capacitor, a trigger circuit for applying a single pulse to the control terminal of the SCR element, a capacitor discharge circuit for discharging with a given time constant the capacitor that has been charged through the SCR element, and a switching circuit for energizing the lamp while the terminal voltage of the capacitor is above a threshold level. The trigger circuit has a high input impedance to protect the control circuit from high voltage which otherwise may be applied thereto through a camera synchro terminal to which the input terminal of the trigger circuit is connectable.

11 Claims, 2 Drawing Figures

DATA IMPRINTING LAMP CONTROL CIRCUIT

BACKGROUND OF THE INVENTION

1. Field of the Invention

The present invention relates to a lamp energization control circuit and more particularly pertains to a control circuit for controlling the energization of a lamp which is adapted to illuminate images, such as of a date of photography, for imprinting them on a film upon photography.

2. Description of the Prior Art

Cameras are well known which contain therein or have detachably attached thereto a data imprinting device for imprinting on a film images representing data such as the date of photography and the exposure conditions for the photography. Such data imprinting devices ordinarily include a lamp for illuminating the images so that light bearing the images is projected onto the film. To effect the data imprinting in response to a camera exposure operation, the flash synchro switch or flash trigger switch, which is provided in the camera and is actuated in relation with a shutter opening, can be utilized for initiating the energization of the lamp. Further to ensure a proper exposure upon the imprinting, the duration of the lamp energization must be controlled. A typical duration control device is an RC delay circuit including a series or parallel connected resistor and capacitor. In the conventional data imprinting devices, the capacitor of the RC delay circuit had to be short-circuited or charged. Accordingly electric energy was consumed for that purpose.

Further, when the flash synchro switch is used for the initiation of the lamp energization, it is likely to occur that an extremely high voltage from the electronic flash device mounted on the camera and electrically connected to the flash synchro switch through a direct contact terminal, is applied to the data imprinting device via the flash synchro terminal for the synchro cord.

SUMMARY OF THE INVENTION

The primary object of the present invention is to provide a lamp energization control circuit for a data imprinting device wherein the consumption of electric energy is greatly decreased or eliminated.

Another object of the present invention is to provide a lamp energization control circuit for a data imprinting device that requires neither pre-charge nor discharge of the capacitor of the RC circuit before the control circuit receives a trigger signal from a camera.

Still another object of the present invention is to provide a lamp energization control circuit of the above type which avoids the possibility of application of the extremely high voltage from an electronic flash device.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

DESCRIPTION OF THE PREFERRED EMBODIMENTS

Figure 1:
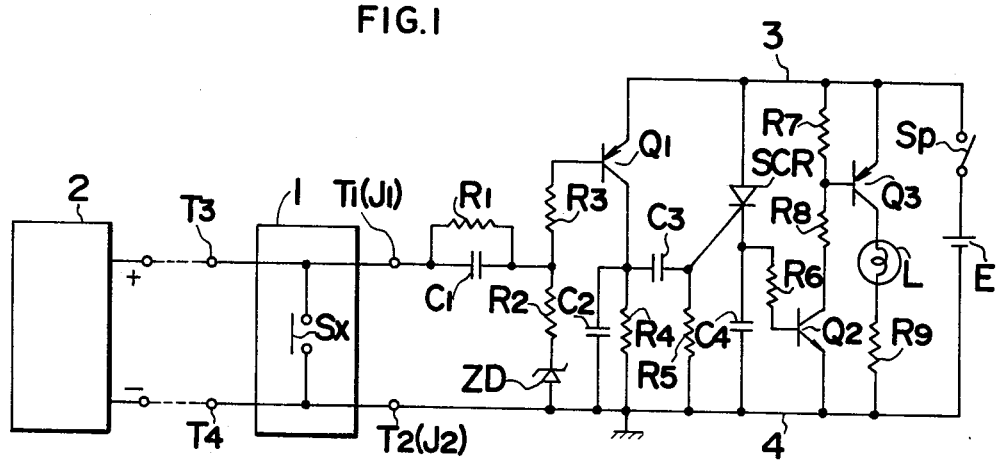
FIG. 1 is a circuit diagram of a preferred embodiment of the present invention.

Referring to FIG. 1, a synchronous switch contact Sx provided in a camera body 1 is arranged to be closed in synchronization with the shutter opening to connect synchronous terminals T1 and T2 for data imprinting and T3 and T4 for flash firing. Block 2 is an electric flash, i.e. a so-called strobo flash device. Connected across synchronous terminals T1 and T2 is a data imprinting control circuit having a power source battery E and a power switch Sp which is manually closed when data imprinting photography is desired. Transistor Q1 has its emitter connected to positive power source bus line 3 connected through switch Sp to source E, its collector grounded or connected through a resistor R4 to negative power source bus line 4 and its base connected through a circuit comprising series connected resistors R3 and R1 and a capacitor C1 connected across resistor R1 to synchronous terminal T1 and is arranged to conduct only for a short time in response to the closure of synchronous contact Sx. Capacitor C1 has for example, a capacity of 0.001 $\mu$F and resistor R1 has a considerably high resistance, e.g. approximately 10 M$\Omega$ or more. The anode and cathode of Zener diode ZD are connected to negative power source bus line 4 and through resistor R2 to the junction of resistors R1 and R3 respectively. Zener diode ZD has a Zener voltage slightly higher than the voltage across the terminals of power source battery E. Resistors R2 and R3 respectively have each a resistance of approximately 5K$\Omega$. Thyristor SCR has an anode connected to positive power source bus line 3, a cathode connected through a timing capacitor C4 to negative line 4 and a gate connected through resistor R5 to negative line 4. The collector of transistor Q1 and the gate of thyristor SCR are AC-coupled together through a capacitor C3. A timer circuit is formed by a transistor Q2 having its emitter connected to negative power source bus line 4 and its base connected to the SCR cathode, a transistor Q3 having its emitter connected to positive power source bus line 3, and resistors R6, R7 and R8, and a capacitor C4 connected as illustrated. This timer circuit energizes a light source lamp L for data imprinting only for a given time. Resistor R9 is connected in series with lamp L between the transistor Q3 collector and negative line for the control of its brightness.

The operation of the above circuit will now be explained. Assuming that no electric flash is connected to camera body 1 when power switch Sp is closed, a voltage from power source battery E is applied through power source bus lines 3 and 4. While synchronous contact Sx remains open, the base current of transistor Q1 does not occur so that transistor Q1 remains in the cut-off on non-conductive condition. Since the Zener voltage of Zener diode ZD is higher than the voltage of power source battery E, the Zener diode ZD has a high impedance. Accordingly the base current of transistor Q1 flowing through Zener diode ZD is negligibly small. Thyristor SCR is not turned on because no trigger voltage is applied to the gate so long as transistor Q1 is non-conductive. In this condition, no forward bias voltage is applied to transistor Q2, which remains in the cut-off condition and so does transistor Q3. Thus power is not consumed while synchronous contact Sx remains open even when the power switch is closed for the power supply. Furthermore, even when terminals J1 and J2 which are coupled and connected with synchronous terminals T1 and T2 are being short-circuited by any accidental cause, resistor R1 having a high resistance makes the base current of transistor Q1 flowing through resistor R1 extremely low, so that the capacity of the power source battery E is maintained over a considerably long period of time.

When synchronous contact Sx is closed, the base current of transistor Q1 flows through resistor R3 and capacitor C1 for a short time to turn on transistor Q1 for also a short time and generate a positive pulse at its collector. This positive pulse is applied through capacitor C3 to the gate of thyristor SCR which in turn is made conductive to charge capacitor C4. When the charging current becomes smaller than the holding current level for the thyristor SCR during this charging stage, thyristor SCR is turned off. Thus capacitor C4 is charged with a predetermined charge. Capacitor C4, when charged, supplies base current through resistor R6 to transistor Q2 which is turned on only for a predetermined time depending on the amount of the charge in capacitor C4 and the resistance of resistor R6. Transistor Q3 is conductive only for a short time as controlled by transistor Q2 during which lamp L is energized for a data imprinting. No current flows in the circuit after the completion of the lighting of lamp L, until synchronous contact Sx is re-closed for another data imprinting.

The following explains the operation of the circuit when electric flash device 2 is connected to synchronous terminals T3 and T4 with a comparatively high level of voltage (of the order about from 200V to 300V) applied across them. A voltage from electric flash 2 is applied through resistors R1 and R2 to the cathode of Zener diode ZD. The potential at the junction between resistors R2 and R3 is nearly equal, in this case, to the Zener voltage by the function of Zener diode ZD. Since the Zener voltage is set at a level slightly higher than the voltage of power souce battery E, transistor Q1 is not turned on by the connection of electric flash 2. When synchronous contact Sx is closed, the potential at the junction between resistors R2 and R3 becomes instantly negative to turn on transistor Q1 and effect data imprinting in the same manner as described earlier.

In the above circuit according to the present embodiment, timing capacitor C4 is connected to the cathode of thyristor SCR. However, this timing capacitor may be connected to the anode of thyristor SCR.

Figure 2:
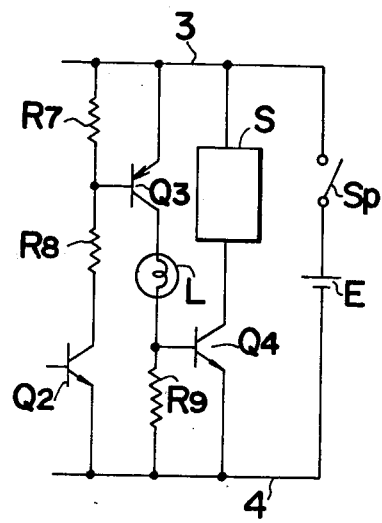
FIG. 2 is a partial circuit diagram showing a modification of the circuit of FIG. 1.

FIG. 2 shows a circuit with an additional means for producing a sound when lamp L is energized. Provided in the circuit are a transistor Q4 which is turned on in response to the voltage generated across the terminals of resistor R9 when lamp L lights, and a sound producing means S which produces sound when supplied with power through the conductive transistor Q4. Sound producing means S may include a known mechanism including an oscillation circuit and a speeker with a piezo-electric element. Sound producing means S does not produce sound when a line is broken within lamp L or when power switch Sp is left on, so that it is highly efficient as a lamp monitor.

Although the invention has been described in its preferred form with a certain degree of particularlty, it is understood that changes in the details of construction and the combination and arrangement of parts may be resorted to without departing from the spirit and the scope of the invention as hereinafter claimed.

We claim:

1. A lamp control circuit for controlling energization of a lamp which is adapted to illuminate images to imprint them on a film in a camera having a flash syncho switch, said control circuit comprising:
    a high input impedance trigger circuit means for generating a single pulse in response to a closure of said flash synchro switch and having an input terminal connectable with said synchro switch;
    semiconductor means coupled to said trigger circuit and having an output transferable to a conductive state in response to said single pulse and maintaining said conductive state following the termination of said single pulse and while the current therethrough exceeds a predetermined level and transferable to a non-conductive state when said current decreases below said predetermined level;
    a capacitor connected in series with said semiconductor means output element to be charged therethrough;
    a discharge circuit means for discharging said capacitor when said capacitor is charged above a given voltage through said semiconductor means output; and
    a semiconductor switching circuit for energizing said lamp while the terminal voltage of said capacitor is above a given level.

2. A lamp control circuit as claimed in claim 1 wherein said semiconductor means includes a SCR element having a gate terminal connected with said trigger circuit means, and a cathod-anode circuit connected with said capacitor.

3. A lamp control circuit as claimed in claim 2 further comprising a power source and wherein said trigger circuit means includes a transistor having a collector coupled to the gate of the SCR element, a parallel connected capacitor and high resistance resistor connected between said input terminal and said base of said transistor, and said transistor being grounded through a zener diode having a zener voltage a little higher than the voltage of said power source, and a high pass filter means for transmitting a single pulse to said gate of said SCR element upon conduction of said transistor.

4. A lamp control circuit as claimed in claim 3 further comprising means for producing an audible signal in response to the energization of said lamp.

5. In a camera including a device for recording data on camera contained film and provided with film exposing electrically energizable light source and a flash synchro switch, a circuit for energizing said lamp comprising:
    first circuit means for producing a trigger pulse output in response to the closing of said synchro switch;
    a source of electric current;
    a timing capacitor;
    a thyristor functionally equivalent second circuit means connected in series with said timing capacitor across said current source and conductive in response to said trigger pulse until the current therethrough falls below a predetermined level; and
    a third circuit connected in series with said lamp across said current source and being conductive and nonconductive in response to the charge on said capacitor.

6. The circuit of claim 5 wherein said second circuit means comprises a thyristor including a gate electrode coupled to the output of said first circuit means and output electrodes connected in series with said timing capacitor across said current source.

7. The circuit of claim 6 wherein said third circuit comprises a first transistor having an output connected in series with said lamp across said current source and a second transistor having its output coupled to the input of said first transistor and its input coupled across said timing capacitor.

8. The circuit of claim 7 wherein one of said transistors is npn and the other pnp.

9. The circuit of claim 6 wherein said first circuit means comprises a Zener diode, a transistor having its output AC coupled to the control input of said thyristor and its control electrode connected through said Zener electrode to a terminal of said current source and through said synchro switch to said current source terminal.

10. The circuit of claim 9 including a pair of series connected resistors connected between said control electrode and current source terminal and a parallel connected resistor and capacitor connected between the junction of said series connected resistors and said synchro switch.

11. The circuit of claim 5 wherein said first circuit means has a high impedance input coupled to said synchro switch.

* * * * *